United States Patent [19]

Ladin

[11] 4,153,308

[45] May 8, 1979

[54] FORKLIFT MAST UNIT WITH HIGH IMPACT BEARING ASSEMBLY

[75] Inventor: Eli M. Ladin, Ann Arbor, Mich.

[73] Assignee: Federal-Mogul Corporation, Southfield, Mich.

[21] Appl. No.: 818,492

[22] Filed: Jul. 25, 1977

Related U.S. Application Data

[62] Division of Ser. No. 617,479, Sep. 29, 1975, Pat. No. 4,054,339.

[51] Int. Cl.² .................. F16C 33/00; F16C 33/58; F16C 33/64
[52] U.S. Cl. .................................................. 308/189 R
[58] Field of Search ............... 308/1, 202, 189 R, 214, 308/216

[56] References Cited

U.S. PATENT DOCUMENTS

| 3,791,706 | 2/1974 | Dobson | 308/216 |
| 3,930,693 | 1/1976 | Bowen | 308/207 R |

*Primary Examiner*—Richard A. Bertsch
*Attorney, Agent, or Firm*—Robert F. Hess

[57] ABSTRACT

A heavy-duty low speed antifriction bearing designed principally for heavy impact loads and comprising a standard inner race member, standard rolling element members, and standard cage member coupled with an outer race member in which the standard grinding and polishing or honing of the raceways, that follow the raceway machine turning operation, are eliminated and replaced with a suitable operation such as tumbling, whereby the sharp projections of the turned raceway surfaces are blunted and there is provided a comparatively rough surface on the outer raceway.

4 Claims, 4 Drawing Figures

FORKLIFT MAST UNIT WITH HIGH IMPACT BEARING ASSEMBLY

This is a division of application Ser. No. 617,479, filed Sept. 29, 1975, now U.S. Pat. No. 4,054,339, issued Oct. 18, 1977.

BACKGROUND OF THE INVENTION

This invention relates to the development of an improved low speed heavy-duty antifriction bearing which is repeatedly subjected to heavy impact loads.

For many years one such application for bearings of this type has been the mast guide of forklift trucks. The history of bearing failure problems in this application has shown that failures are rarely due to fatigue from running but are characteristically broken outer races which are continually subjected to shock loading. Shock loading happens every time the fork truck bumps into something solid with the fork.

In the prior art, the approach to solving this problem has been to make the race members, or at least the outer race member larger and heavier in cross section. This has reduced the incidence of broken race members but has increased the cost of the bearings without completely solving the broken outer race member problem.

SUMMARY OF THE INVENTION

The present invention consists of a heavy-duty, low speed, high-impact antifriction bearing in which at least the raceway of the outer race member, after it has been turned, has been subjected to the finish step of tumbling or suitable alternative, to give a raceway having a surface finish of between 75 and 250 microinches R.M.S. (Root Mean Square) and preferably between 125 and 150 microinches R.M.S., and wherein due to this comparative roughness of the raceway there will be produced, it is believed, a greater incidence of residual compressive stress at the surface thereof with which to resist fracture from external impact loads.

DESCRIPTION OF THE PREFERRED EMBODIMENT

Figure 1:
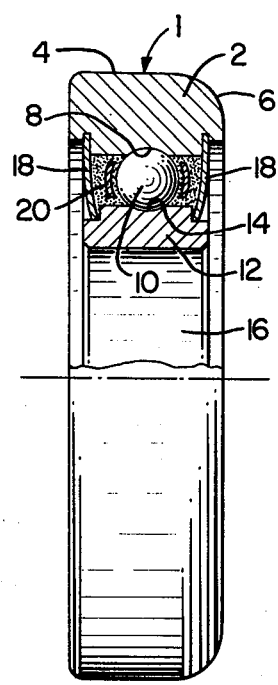
FIG. 1 shows a partial cross section of the preferred embodiment of a mast guide bearing in accordance with the present invention.
Figure 4:
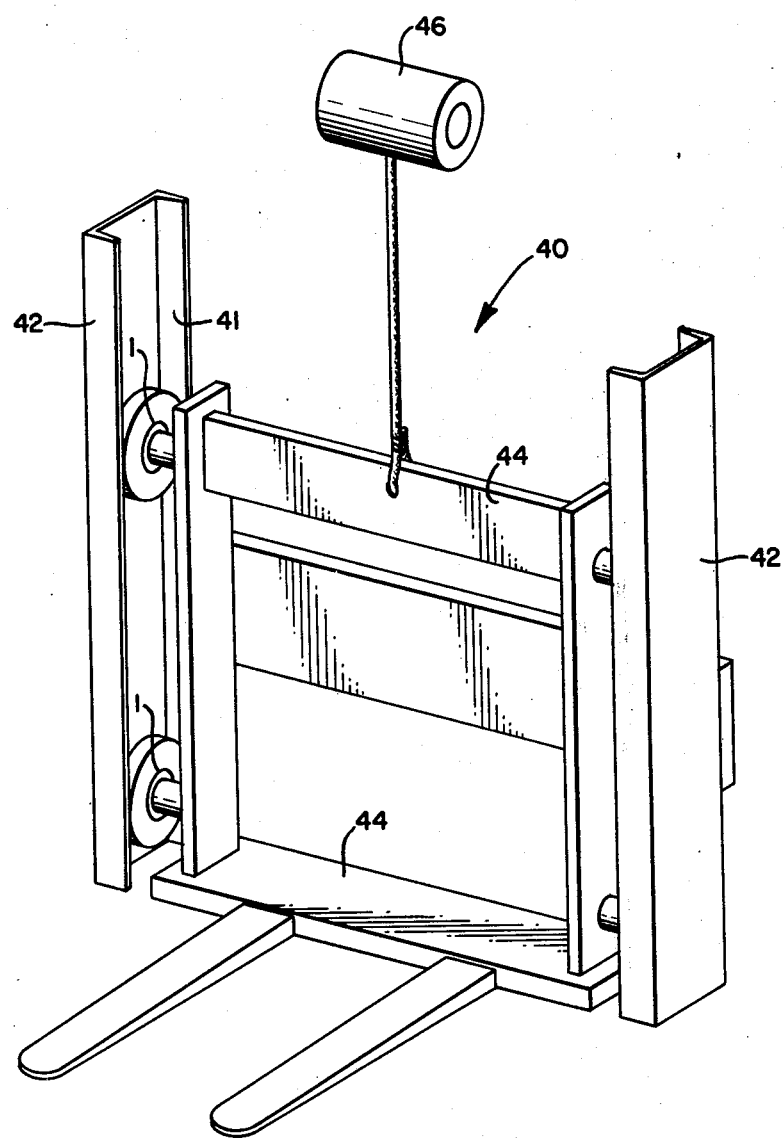
FIG. 4 is a perspective view illustrating the forklift mast and mast guide bearing assembly in accordance with the present invention.

The preferred example of a high impact, low speed, antifriction bearing is a mast guide bearing 1 as shown in FIGS. 1 and 4. The outer race 2 comprises an outer surface 4 which contacts the mast 42 of a forklift mast unit 40, the rounded corner 6 which helps guide the bearing in the mast track 41, and the ball raceway 8 in which the balls 10 roll. These surfaces 4, 6 and 8 have been machined, hardened, and tumbled in a manner described hereafter to give a surface finish of approximately 150 microinches R.M.S. with a hardness of 58–62 Rc.

As seen in FIG. 4, forklift mast unit 40 includes a carriage 44 which carries the upper and lower pair of mast guide bearings and which is driven by a motorized winch 46 or other suitable means, all as is conventional in the art.

The inner race 12 comprises a ball raceway 14 and a bore 16 both of which have been machined, heat treated, and ground, as is conventional in the art, to a surface finish of approximately 15 microinches R.M.S. with a hardness of 58–62 Rc.

A material such as 5160-H steel is preferred but TBS-9 or 52100 steel is also acceptable for through hardening. In addition, any of the carburizing steels may be used if the bearings are to be subjected to a carburizing type heat treatment instead of through hardening.

The process of manufacture includes turning the outer race 2 to the desired configuration after which it is through hardened to 58–62 Rc. while the surface finish is approximately 150 microinches R.M.S. The race 2 is then tumbled in a conventional tumbling operation using small stones. This operation reduces the sharp edges, caused by the tearing and cutting of the turning operation, to rounded edges and protrusions that are typical of the peening and erosion encountered during tumbling. The process of tumbling, although it changes the appearances of the surface, does not change materially the surface finish which remains at approximately 150 microinches R.M.S.

The inner race 12 is also turned and hardened to 58–62 Rc. At this point, however, instead of tumbling, the inner race 12 is surface ground, bore ground, and race ground in that order giving surface finishes of approximately 15 microinches R.M.S.

The races 2 and 12 are then assembled with grade 1 balls 10 and the bearing assembly is completed by adding the seals 18 and the ball cage 20.

The assembled bearings for test purposes are then given a "dead weight" drop test to determine the bearings susceptibility to damage from impact loading. The test is performed by holding the bearing by the bore while a dead weight of 60 pounds is dropped radially on the bearing from a height of 20 inches. After each drop the height of fall is increased by increments of two inches until failure occurs. Normally the outer race 2 is the first to fracture. The height of the final fall before fracture is considered as the bearing's rating. It has been established that conventional 35 mm bearings with ground inner and outer races have an average rating of 36 inches. By contrast, however, the bearings of this invention with the tumbled outer races 2 have an average rating of 54 inches which is an increase of 50% over the conventional bearing.

Figure 2:
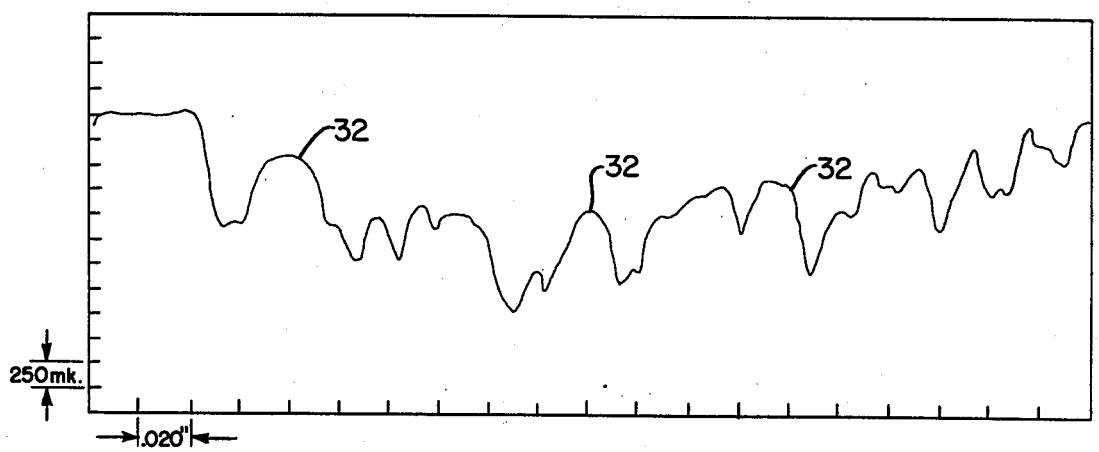
FIG. 2 shows an enlarged profile of the raceway surface of a bearing outer race member made with an axial sweep of a Proficorder stylus after the tumbling operation in accordance with the present invention.

This surprising increase in performance is attributed to the small rounded irregularities 32 in FIG. 2 of the raceway 8 of outer race member 2 acting as small collapsible steering columns which absorb the impact energy and more widely distribute the Hertz stresses induced by impact. As understood in the art, however, it is well known that grinding a hardened surface introduces tensile stresses which are vulnerable to impact fracture. On the other hand, tumbling or shot peening is believed to introduce compressive stresses in the surface which are resistant to impact fracture. It is further known in the art that case hardening and carburization also induce compressive stresses in the surface of steel which are impact resistant. This being the case, it is also within the scope of my invention to combine both impact resistant compression stress inducing operations in race manufacture by subjecting them to both tumblind and case hardening.

Again, with respect to FIG. 2, there is shown at a magnification of 25 X on the horizontal scale and 1,000 X on the vertical scale, the rounded irregularities 32 of a turned raceway 8 after it has been subjected to the aforesaid tumbling operation. The tumbling operation reduces the sharp edges, caused by tearing and cutting in the turning operation, to the characteristic rounded irregularities 32 by the process of peening and erosion.

Figure 3:
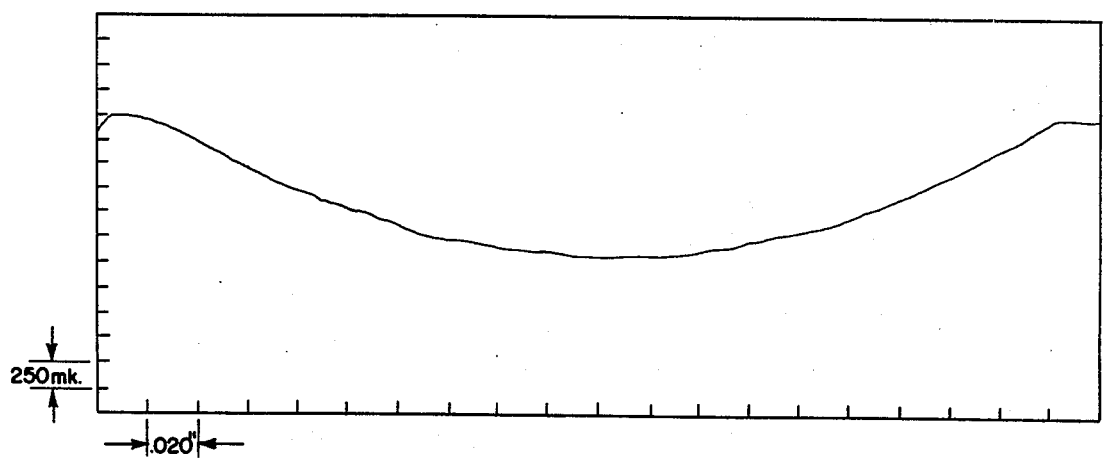
FIG. 3 shows an enlarged profile of the raceway surface of a bearing outer race member made with an axial aweep of a Proficorder stylus after the conventional grinding and honing or polishing operation.

FIG. 3 shows for comparison a conventional raceway at the same magnification as FIG. 2, that has been ground to a surface finish of 15 microinches R.M.S.

To those skilled in the art to which this invention relates, differing construction embodiments and applications of the invention will suggest themselves without departing from the spirit and scope of the invention. The disclosures and the descriptions herein are purely illustrative and are not intended to be limiting in any sense. For example, while I have not found it necessary for present product application, one could produce both the inner and the outer raceway in the manner I have described above for the outer raceway.

I claim:

1. In a forklift mast unit including an upright element having at least one load-bearing longitudinal track, a carriage arranged for longitudinal movement relative to the upright element, motor means for moving the carriage relative to the upright element, at least one high-impart antifriction bearing assembly attached to the carriage for load-bearing rolling contact with the at least one load-bearing longitudinal track, the improvement comprising:

said high-impact antifriction bearing assembly having an inner race member with a radially outward facing annular raceway extending around the outside thereof, race member circumferentially encompassing and disposed radially outward of said inner race member and comprising a radially inward facing annular raceway extending circumferentially around the inside thereof coaxial with the axis of rotation of said bearing assembly, a plurality of antifriction rolling elements confined between said inner race member and said outer race member and rolling in said raceways thereof, the raceway of at least one of said race members having small rounded shock-absorbing protrusions projecting outwardly from the surface thereof with surface finishes between 75 and 250 microinches R.M.S.

2. A forklift mast unit as described in claim 1 wherein the raceway of said at least one race member includes a surface finish in the range of 125 to 150 microinches R.M.S.

3. A forklift mast unit as described in claim 1 wherein the rolling elements are balls.

4. A forklift mast unit as described in claim 1 wherein said race members are case hardened or carburized.

* * * * *